United States Patent
Stancu et al.

(10) Patent No.: US 6,984,960 B2
(45) Date of Patent: Jan. 10, 2006

(54) METHODS AND APPARATUS FOR CURRENT CONTROL OF A THREE-PHASE VOLTAGE SOURCE INVERTER IN THE OVERMODULATION REGION

(75) Inventors: Constantin C. Stancu, Anaheim, CA (US); Silva Hiti, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 71 days.

(21) Appl. No.: 10/634,528

(22) Filed: Aug. 5, 2003

(65) Prior Publication Data

US 2005/0029982 A1    Feb. 10, 2005

(51) Int. Cl.
H02P 5/34 (2006.01)
H02P 7/42 (2006.01)
G05B 11/01 (2006.01)

(52) U.S. Cl. .................... 318/801; 318/632; 318/629; 318/811

(58) Field of Classification Search ............... 318/629, 318/801, 811, 632, 254, 138, 825, 439, 721; 363/39–48
See application file for complete search history.

(56) References Cited

U.S. PATENT DOCUMENTS

| | | | |
|---|---|---|---|
| 5,047,909 A | * | 9/1991 | Hosoda .................. 363/40 |
| 5,321,599 A | * | 6/1994 | Tanamachi et al. ........... 363/41 |
| 6,008,618 A | * | 12/1999 | Bose et al. ................ 318/811 |
| 6,163,128 A | | 12/2000 | Hiti et al. |
| 6,208,540 B1 | | 3/2001 | O'Meara et al. |
| 6,222,335 B1 | | 4/2001 | Hiti et al. |
| 6,262,896 B1 | | 7/2001 | Stancu et al. |
| 6,288,515 B1 | | 9/2001 | Hiti et al. |
| 6,362,585 B1 | | 3/2002 | Hiti et al. |
| 6,366,043 B1 | | 4/2002 | Stancu et al. |
| 6,504,329 B2 | | 1/2003 | Stancu et al. |
| 6,507,505 B2 | * | 1/2003 | Oka et al. ................ 363/47 |
| 6,768,280 B2 | * | 7/2004 | Kitajima ................ 318/432 |
| 6,777,907 B2 | * | 8/2004 | Ho ........................ 318/801 |
| 2002/0171387 A1 | | 11/2002 | Stancu et al. |
| 2005/0110450 A1 | * | 5/2005 | Stancu et al. ............ 318/609 |

OTHER PUBLICATIONS

Hava/Sul/Kerkman/Lipo, "Dynamic Overmodulation Characteristics of Triangle Interaction PWM Methods", IEEE Industry Applications Society, New Orleans, Louisana, Oct. 5-9, 1997, vol. 2, pp. 1520-1528.

Holtz, "Pulsewidth Modulation—A Survey", IEEE Transactions on Industrial Electronics, vol. 39, No. 5, Dec. 1992, pp. 410-420.

(Continued)

*Primary Examiner*—David Martin
*Assistant Examiner*—Patrick Miller
(74) *Attorney, Agent, or Firm*—Christopher DeVries

(57) ABSTRACT

A drive system that is suitable for high bandwidth current control of a three-phase voltage source inverter in the overmodulation region includes a feedback path that has a harmonic decoupling block that subtracts selected harmonic components from signals representative of a corresponding motor phase current signal. The harmonic decoupling block thereby generates corrected feedback signals. The drive system also includes subtractor blocks that subtract the corrected feedback signals from signals representative of open-loop magnetizing reference currents to generate difference signals. Also included is a modulation block that utilizes the difference signals to produce signals to drive a three-phase voltage source inverter in an overmodulated six-step mode.

20 Claims, 7 Drawing Sheets

OTHER PUBLICATIONS

Holtz/Lotzkat/Khambadkone, "On Continuous Control of PWM Inverters in the Overmodulation Range including the Six-Step Mode", Proceedings of the 1992 International Conference on Industrial Electronics, Control, Instrumentation, and Automation, vol. 1 of 3, Nov. 9-13, 2002, pp. 307-312.

Khambadkone/Holtz, "Compensated Synchronous PI Current Controller in Overmodulation Range and Six-Step Operation of Space-Vector-Modulation-Based Vector-Controlled Drives", IEEE Transactions on Industrial Electronics, vol. 49, No. 3, Jun. 2002, pp. 574-580.

* cited by examiner

METHODS AND APPARATUS FOR CURRENT CONTROL OF A THREE-PHASE VOLTAGE SOURCE INVERTER IN THE OVERMODULATION REGION

FIELD OF THE INVENTION

The present invention relates to methods and apparatus for driving inverters, and more particularly, to methods and apparatus for high bandwidth control of motor drive systems.

BACKGROUND OF THE INVENTION

The maximum output voltage of a 3-phase voltage source inverter (VSI) is obtained when it is operated in six step mode. In this mode and referring to FIG. 1, a reference voltage vector V* occupies six discrete positions V1, V2, V3, V4, V5, and V6. In this mode, the peak value of the fundamental phase voltage is $2V_{DC}/\pi$, where $V_{DC}$ is the value of the DC bus voltage at the inverter input. A figure of merit, or modulation index, can be defined as:

$$m = \frac{v_{pk}}{2V_{DC}/\pi}, \quad (1)$$

where $v_{pk}$ is the peak value of the fundamental of the output phase voltage of the inverter. The modulation index m is introduced for the purpose of characterizing other modes of the inverter operation.

When the vector V* follows a circle 10 inscribed in hexagon 12 defined by discrete positions V1, V2, V3, V4, V5, and V6, the value of the modulation index is m=0.785. The use of space vector modulation, where reference vector V* follows the perimeter of hexagon 12 increases the modulation index to 0.908. The operating region between m=0.908 and m=1 is defined as "overmodulation." The use of overmodulation in VSI motor drives improves DC bus voltage utilization and maximizes the AC output voltage of the inverter. These improvements can be useful in VSI powered motor drives, where maximum motor torque is proportional to the square of the applied AC voltage.

Although overmodulation increases the output fundamental voltage of the inverter by about 10%, it also introduces superior harmonics. It is known that the line-to-neutral output voltage $V_{l-n}$ of an inverter in six-step mode can be written:

$$V_{l-n} = \frac{2V_{dc}}{\pi}\left[\sin(\omega t) - \frac{1}{5}\sin(5\omega t) - \frac{1}{7}\sin(7\omega t) - \ldots\right]. \quad (2)$$

The 6n±1 order harmonics in the line-to-neutral voltages are typical for a Y-connected load, which is the case of electric motors. The harmonic voltages will generate harmonic currents of the same order into the motor supplied by the inverter. This situation is illustrated by FIG. 2, in which waveform 14 represents stator flux position angle, waveform 18 represents stator phase A current, and waveform 16 represents a stator current spectrum. The 5th harmonic (630 Hz=126 Hz×5) and the 7th harmonic (882 Hz=126 Hz×7) of the phase current of an induction motor operated in the overmodulation region can be observed.

To apply field-oriented control of the motor, the motor phase currents are passed through a coordinate transformation, from the stationary reference frame to the rotor field reference frame. Consequently, the 6n±1 order harmonics become ±6n harmonics and are superimposed on the stationary reference frame stator currents, which are DC values. This superimposing can be observed in FIG. 3, which is an oscillogram recorded under conditions similar to those of the oscillogram of FIG. 2. However, in FIG. 3, the spectrum of the q-axis current is shown. More particularly, waveform 20 represents stator flux position angle, waveform 24 represents q-axis current, and waveform 22 represents a q-axis current spectrum. The dominant harmonics are the 6th and the 12th, which are at approximately 750 Hz and 1.5 kHz. Similar ripple will appear in the d-axis current. The effect on the rotor flux, and thus, on the motor torque, is greatly reduced, because the ripple is filtered by the rotor circuit with the rotor time constant, if the motor is an induction motor.

The q-axis current 24 depicted by the oscillogram in FIG. 3 is applied as negative feedback at the input of a current controller of a field-oriented motor drive system. If a high bandwidth current controller is used for achieving good dynamic performance of the motor torque, the ±6n harmonic ripple can pass through the current controller. The most significant components of this ripple are the 6th and 12th harmonics, which can pass through the current controller and can render the operation of the motor drive unstable, even in steady state. This problem is evident in the oscillograms of FIG. 4 and FIG. 5, in which the phase current waveforms 26, 28, 30, and 32 are irregular and exhibit increased ripple. (In FIG. 4, stator flux position angle is represented by waveform 34 and q-axis current by waveform 36.)

One method known to reduce this instability is to lower the gain of the current controller, which in turn lowers its bandwidth. The decreased bandwidth avoids perturbation of the system by high order harmonics present in the current feedback. However, this solution trades tight current regulation for stability, and tight current regulation is useful in high dynamic response motor drive systems or motor drives operating over a wide field weakening range.

In Holtz et al., "On Continuous Control of PWM Inverters in the Overmodulation Range Including Six-Step Mode," Proc. IECON '92, pp. 307–312, 1992, two overmodulation modes are described. In one mode, a microprocessor changes the magnitude of a reference without changing its angle. Pulsewidth control in this overmodulation range can be carried out as long as a portion of the track of V* exists within hexagon 12. In a second overmodulation mode, modulation index is higher than in the first mode, and the processor changes both the magnitude and phase of the reference. Current distortion can be decreased by increasing the switching frequency. Errors in feedback due to overmodulation are discussed, and a switching algorithm is proposed that selects a switching state providing a negative rate of change of current in the d-direction. Compensating for selected harmonic components is not shown or suggested.

In Khambadkone et al., "Compensated Synchronous PI Current Controller in Overmodulation Range and Six-Step Operation of Space-Vector-Modulation-Based Vector Controlled Drives, IEEE Trans. on Indust. Elect., vol. 49, pp. 574–580, June 2002, a harmonic estimation correction to feedback is proposed for a controller. Current control is carried out in field coordinates, and harmonic disturbances are compensated before a feedback current signal is fed to a controller. A total harmonic voltage correction is estimated to perform this correction. The total harmonic voltage correction is estimated utilizing a first order approximation in field coordinates. The harmonic current error due to overmodulation is compensated by the estimated value. Compensating for selected harmonic components is not shown or suggested.

SUMMARY OF THE INVENTION

Thus, some configurations of the present invention provide a drive system suitable for current control of a three-phase voltage source inverter in its overmodulation region. The drive system includes a feedback path that has a harmonic decoupling block that subtracts selected harmonic components from signals representative of a corresponding motor phase current signal. The harmonic decoupling block thereby generates corrected feedback signals. The drive system also includes subtractor blocks that subtract the corrected feedback signals from signals representative of open-loop magnetizing reference currents to generate difference signals. Also included is a modulation block that utilizes the difference signals to produce signals to drive a three-phase voltage source inverter in an overmodulated six-step mode.

In some configurations, the signals representative of a corresponding motor phase current signal are signals in a rotor field reference frame. Moreover, the feedback path can also include a coordinate transform block. This block transforms feedback signals in a stationary reference frame to the signals representative, in the rotor field reference frame, of a corresponding motor phase current signal. In addition, the feedback path can also include a harmonic decoupling block (HDB). The HDB subtracts components of at least one 6n order harmonic contained in the signals representative of a corresponding motor phase current signal, thus generating corrected feedback signals. The number n is an integer, n>0, and the harmonics are relative to a fundamental frequency of a phase current of the three-phase voltage source inverter.

In various configurations, the HDB subtracts components of at least a sixth order harmonic. Also, the HDB can include a d-channel block and a q-channel block. The d-channel block and the q-channel block can each include a multiplier block that multiplies a first signal input to the HDB by a first sinusoid at a sixth harmonic frequency. This multiplication generates a base band signal indicative of a sixth harmonic component contained in the first input signal. Each channel block can also include a low-pass filter block that inputs the base band signal and outputs a signal indicative of an average of the sixth harmonic component contained in the first input signal. Each channel block can further include a multiplier block that multiplies the signal indicative of the sixth harmonic component contained in the first input signal by a sinusoid at the sixth harmonic frequency. This multiplication produces a sixth harmonic cancellation component signal. The HDB can further include a subtractor block that subtracts at least the sixth harmonic cancellation signal from one of the signals representative, in the rotor field reference frame, of a corresponding motor phase current signal. This subtraction produces one of the corrected feedback signals.

In some configurations, in each channel block, the first input signal is one of the signals representative, in the rotor field reference frame, of a corresponding motor phase current signal.

In various configurations, each channel block can further include a high pass filter block. The high pass filter block filters one of the corrected feedback signals to produce a harmonic containing signal.

Also in some configurations, the HDB can further include a frequency multiplier block that produces the sinusoids at the sixth harmonic frequency utilizing a second signal input to the HDB. The second signal wherein said second input signal is a signal representative of a voltage vector signal from a three-phase motor. The sinusoid utilized by the first multiplier block and the sinusoid utilized by the second multiplier block can both be phase-referenced to said second input signal.

In some configurations, the HDB also subtracts components of a twelfth order harmonic.

It will be seen that various configurations of the present invention reduce or eliminate higher order harmonics from feedback current signals in PWM inverters operating in the overmodulation mode. Various configurations of the present invention thus allow the use of high bandwidth current controllers within motor drive systems and avoid compromises in dynamic performance when operating in the overmodulation mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
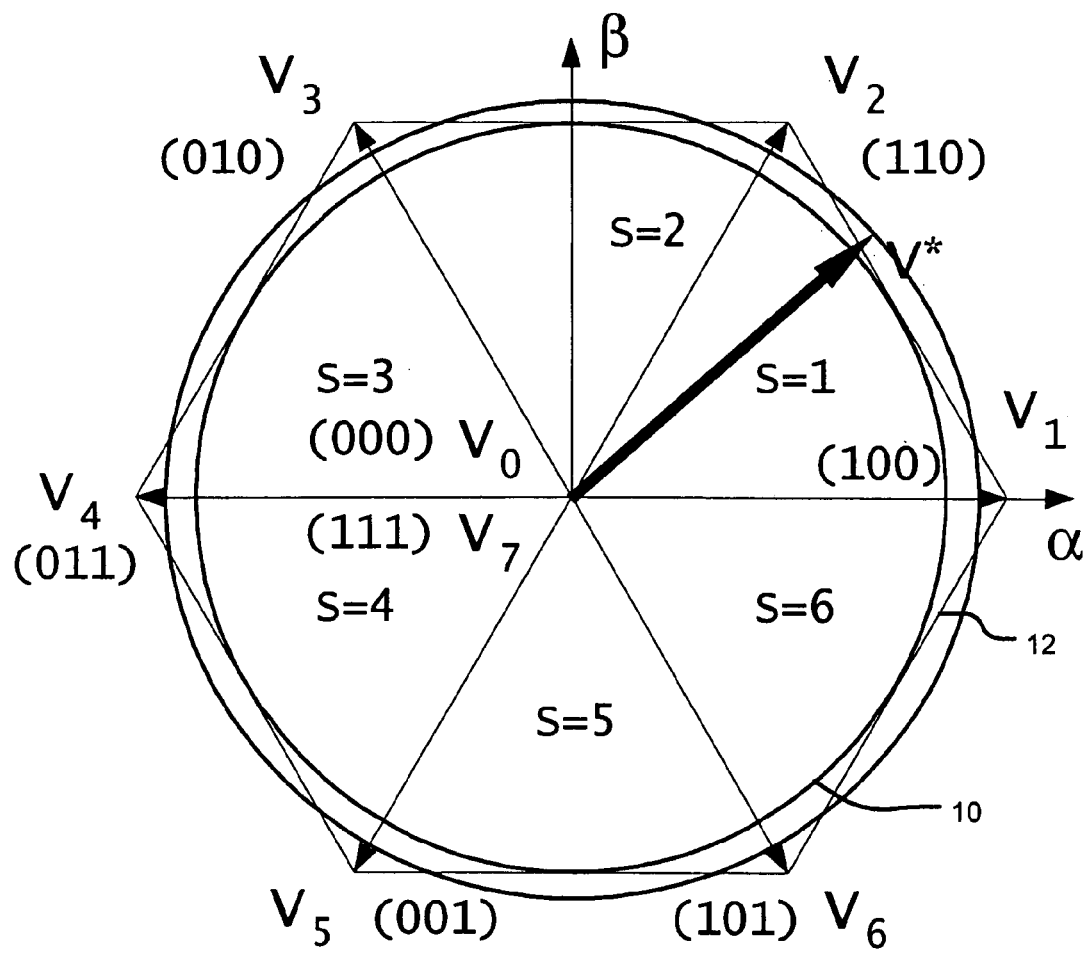
FIG. 1 is a drawing illustrating voltage switched inverter (VSI) switching space states.
Figure 2:
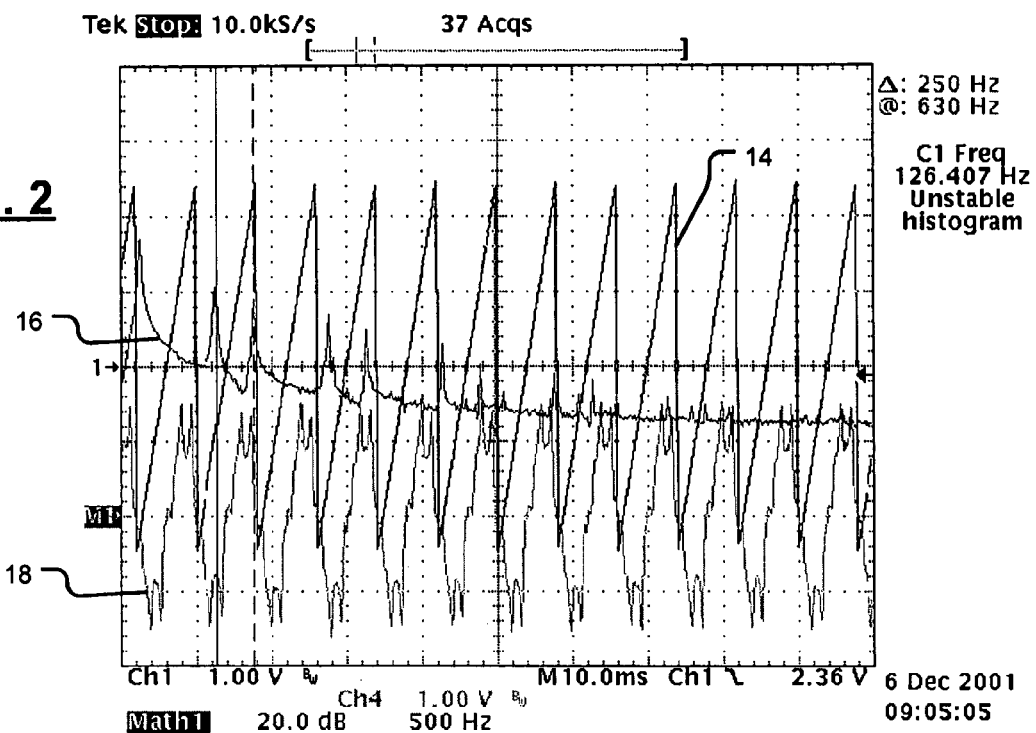
FIG. 2 is a drawing of waveforms representative of current waveforms and spectrum in six-step overmodulation, showing 5th and 7th harmonics of the phase current of an induction motor operated in the overmodulation region.
Figure 3:
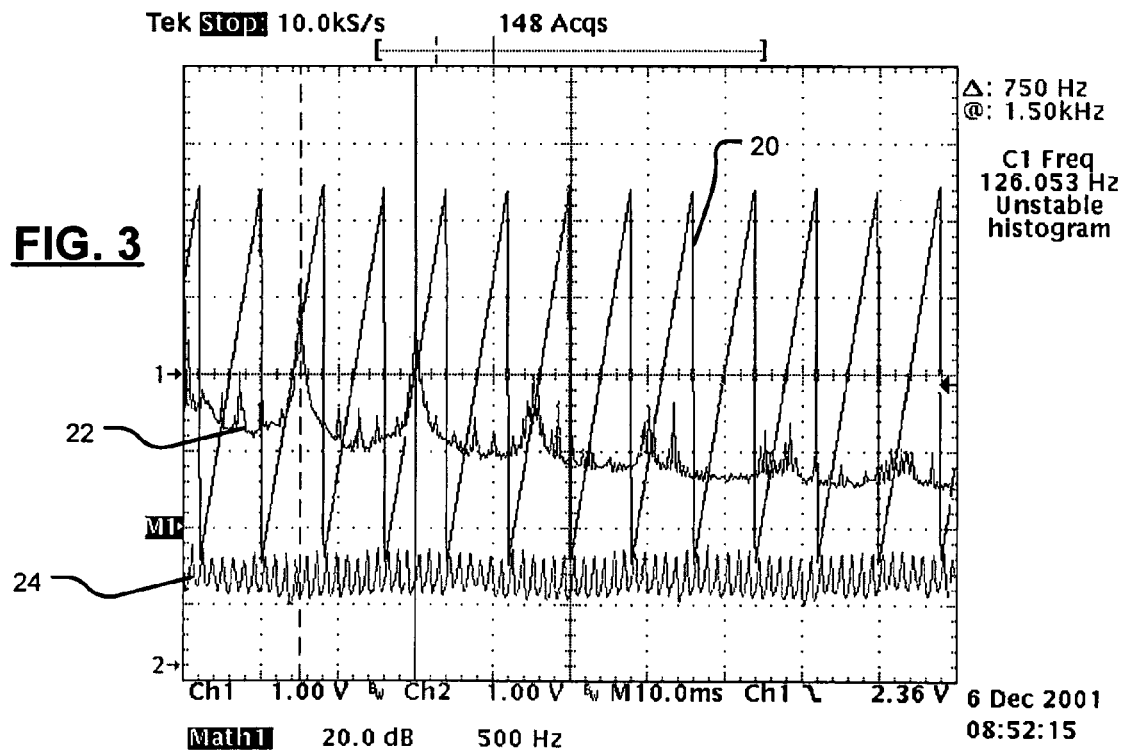
FIG. 3 is a drawing of waveforms produced under conditions similar to FIG. 2, except that only the spectrum of q-axis current is shown.
Figure 4:
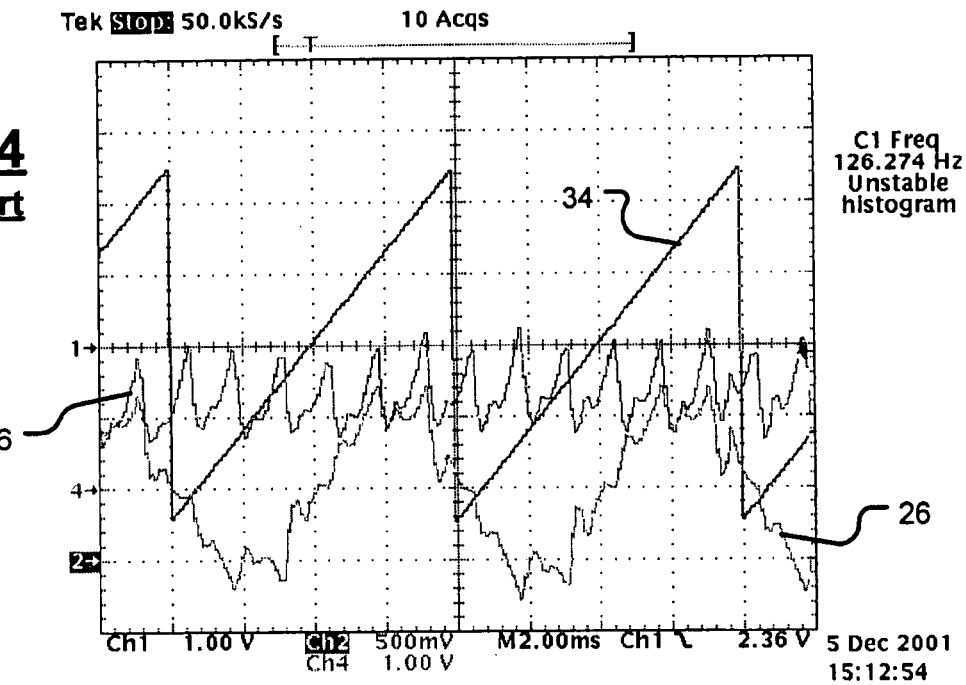
FIG. 4 and FIG. 5 are drawings of prior art waveforms showing irregular phase current waveforms exhibiting ripple.
Figure 5:
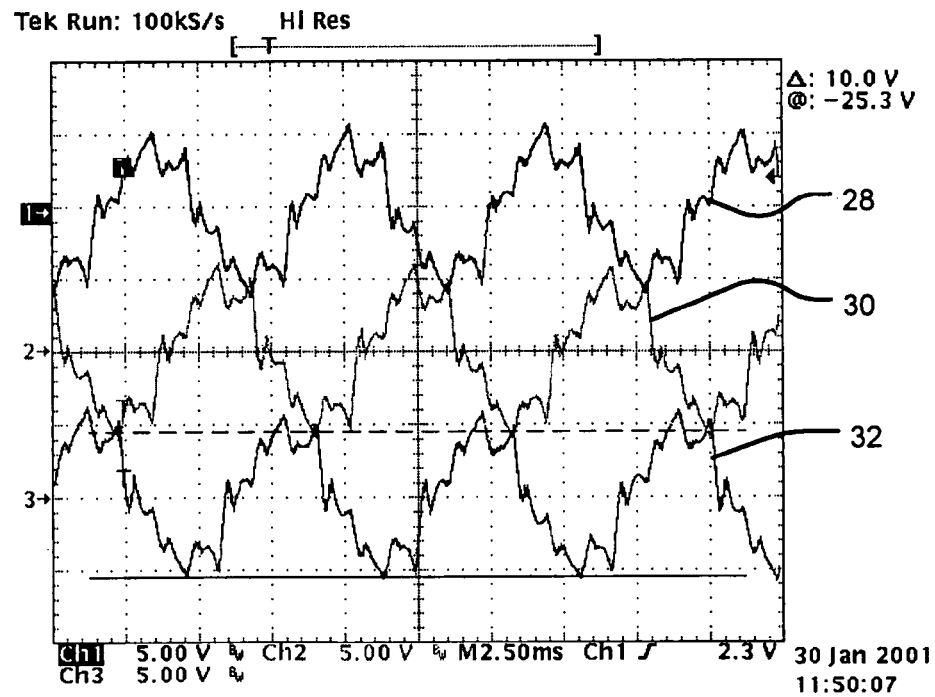
Figure 6:
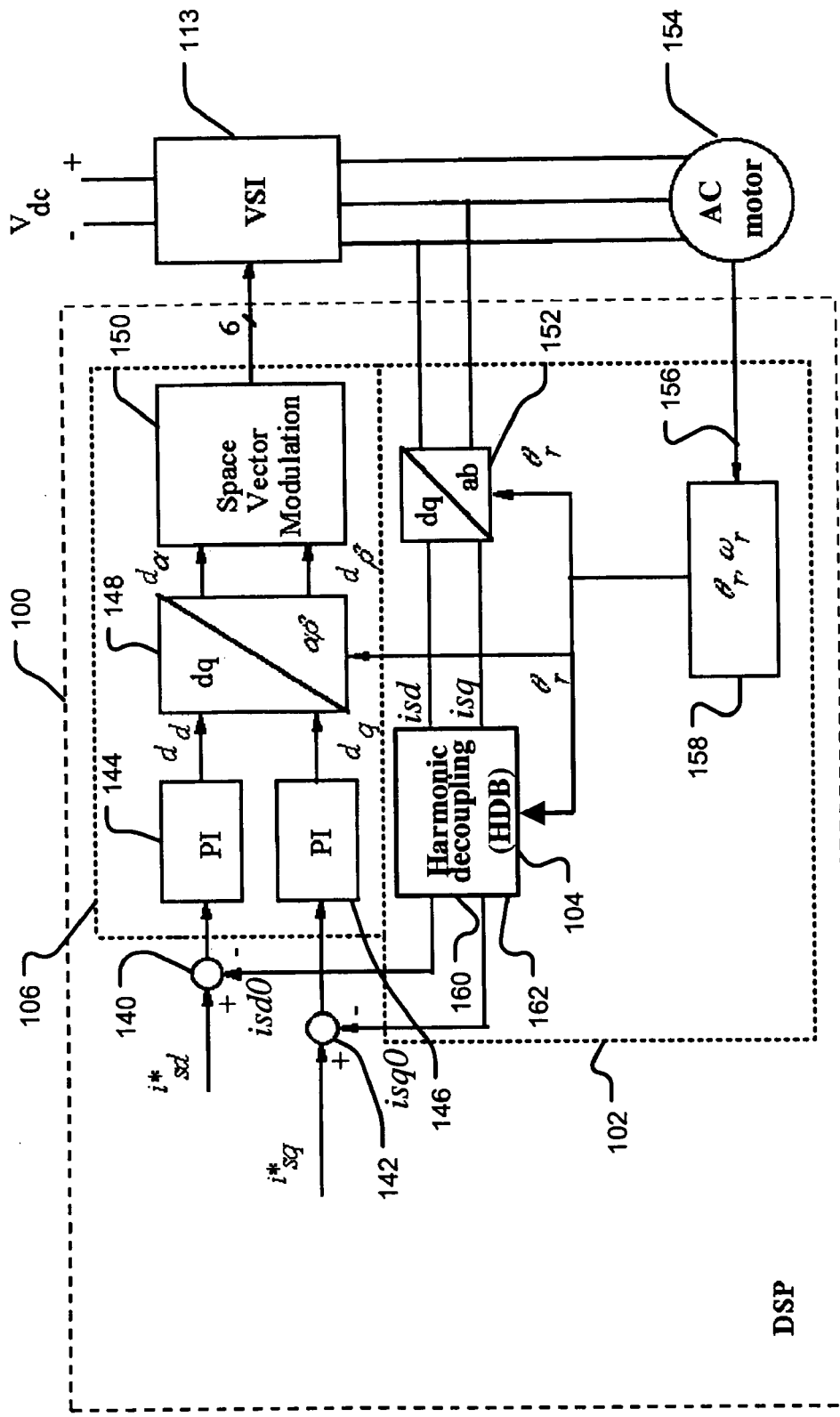
FIG. 6 is a block diagram representing various configurations of a drive system of the present invention.

In some configurations and referring to FIG. 6, a drive system 100 is provided that reduces higher order harmonics from a feedback current signal. Drive system 100 allows use of a high bandwidth current control within a motor drive system and avoids having to trade off system dynamic performance when operating in an overmodulation range. In some configurations, drive system 100 can be a modified version of a portion of a surface-mounted permanent-magnet synchronous (SMPMS) drive. SMPMS drives are more fully described in Stancu et al., "Apparatus and Method for Controlling Permanent Magnet Electric Machines," U.S. Pat. No. 6,504,329 B2, issued Jan. 7, 2003, hereby incorporated by reference in its entirety. Input signals $i_{sd}^*$ and $i_{sq}^*$ can be derived from a flux weakening block, not shown in FIG. 6, but described in the aforementioned patent publication.

In some configurations and referring to FIG. 6, drive system 100 comprises a feedback path 102. Feedback 102 includes a harmonic decoupling block 104 that is configured to subtract selected harmonic components from signals representative of a corresponding motor current signal. For example, the representative signals are $i_{sd}$ and $i_{sq}$, and the reference plane is a rotor field reference plane. This subtraction generates corrected feedback signals, for example, $i_{sd0}$ and $i_{sq0}$. Drive system 100 also comprises subtractor blocks 140 and 142 that are configured to subtract the corrected feedback signals from signals representative of open-loop magnetizing reference currents, for example, $i_{sd}^*$ and $i_{sq}^*$. As a result, difference signals are generated that are applied to modulation block 106.

In various configurations, modulation block 106 includes two controllers 144, 146, such as anti-windup proportional-integral (PI) controllers, in a synchronous reference frame. In some configurations, controller types other than PI controllers may be used. Controllers 144 and 146 are used for current control. Output magnetizing error $i_{sd}^*$ and torque current error $i_{sq}^*$, respectively, are provided as input to controllers 144 and 146, respectively.

Modulation block 106 can also include a space vector modulator (SVM) 150 with a smooth transition from sine wave to a full six-step operation. SVM 150 can be employed to generate insulated gate bipolar transistor (IGBT) gate signals, although other types of pulse width modulation techniques can be employed. Space vector modulation reduces IGBT switching losses, while full six-step mode operation enables maximum DC bus voltage utilization. SVM 150 is configured to drive voltage source inverter (VSI) 113 in an overmodulated six-step mode.

Coordinate transform blocks 148 are 152 are provided in some configurations to transform drive and feedback signals between rotating reference and stationary reference frames and vice versa, respectively. For example, coordinate transform block 152 transforms motor phase current signals in a stationary reference plane to signals $i_{sd}$ and $i_{sq}$ representative of the motor phase current signals in a rotor field (i.e., rotating) reference plane.

Motor 154 is driven by VSI 113, which is coupled to a DC voltage source (shown as $V_{dc}$ in FIG. 6) such as a battery. Motor 154 can be, for example, a three-phase SMPMS motor having a 14 kW peak output and capable of operating at 4500 RPM and 900 Hz. VSI 113 can be a 6-switch, 3-phase inverter. A rotor position dependent signal 156 is provided from AC motor 154. This signal may be converted into a rotor position signal $\theta_r$ by a measurement block 158. Rotor position signal $\theta_r$ and rotor position dependent signal 156 are both considered as examples of "signals representative of a voltage vector signal from a three-phase motor," as that term is used herein.

Figure 7:
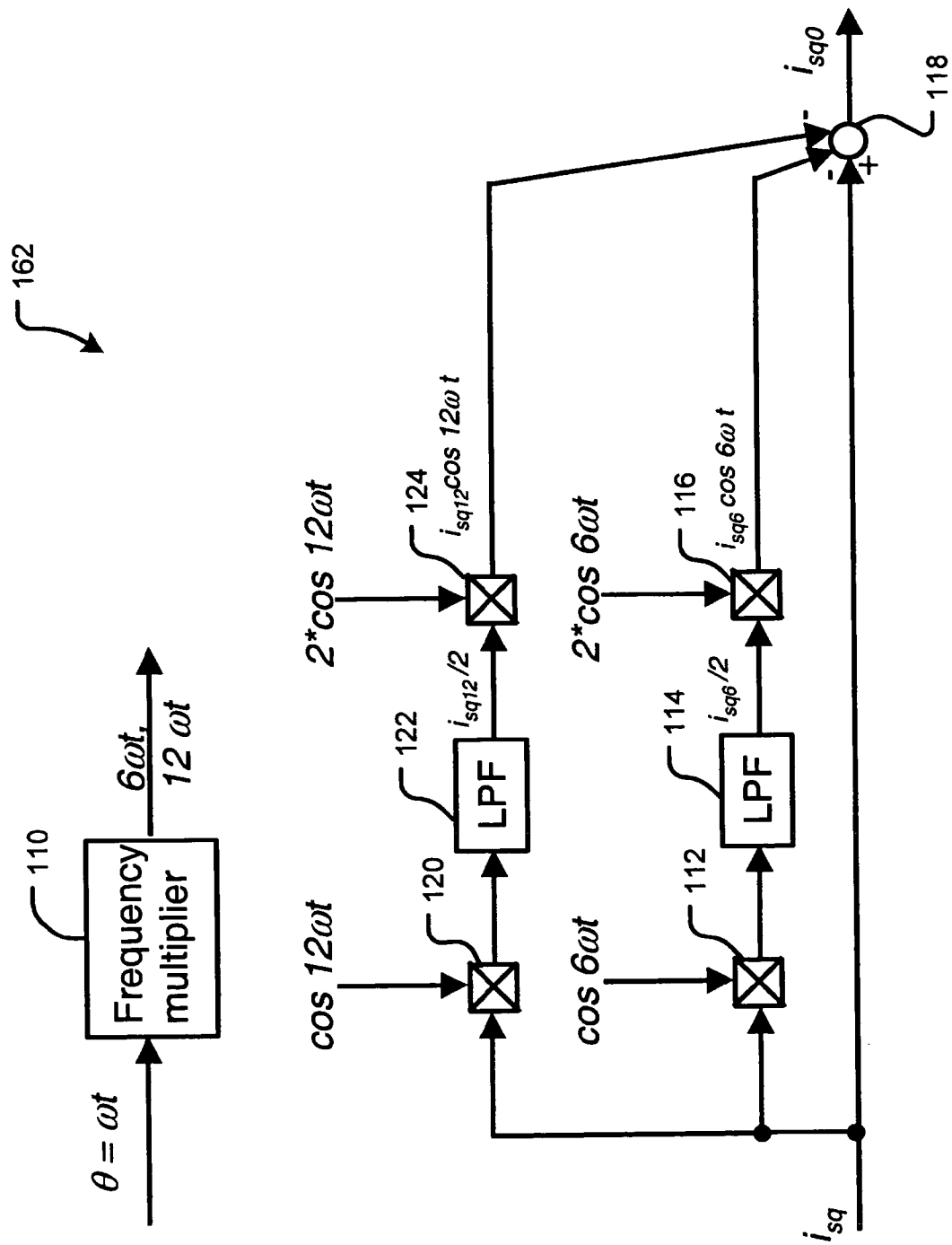
FIG. 7 is a block diagram representative of various configurations of a decoupling circuit suitable for use in the drive system of FIG. 6.

Harmonic decoupling block (HDB) 104 in drive system 100 includes a d-channel 160 and a q-channel 162, which may process signals in the same manner. FIG. 7 is a representative functional diagram of a q-channel 162, but may also be considered as representative of a d-channel 160, as well.

A rotor position signal $\theta_r$ is supplied as one of a plurality of inputs to frequency multiplier block 110. One or more voltage harmonics described by equation (2) above are phase referenced to rotor position signal $\theta_r = \omega t$, for example, harmonics of order 6n, where n is an integer greater than or equal to 1. Frequency multiplier block 110 produces one or more sinusoids of order 6n, for example, $\cos(6\omega t)$ and $\cos(12\omega t)$. In some configurations, these sinusoids are also made available in ×2 amplitude. Because these sinusoids can be used in both q-channel block 162 and d-channel block 160, blocks 162 and 160 can share components used to generate the sinusoids.

The harmonic components in the q-axis current are:

$$i_{sq} = i_{sq0} + i_{sq6+}\sin(6\omega t - \phi_{6+}) + i_{sq6-}\sin(6\omega t - \phi_{6-}) + i_{sq12+}\sin(12\omega t - \phi_{12+}) + i_{sq12-}\sin(12\omega t - \phi_{12-}) + \quad (3)$$

Because the behavior of an AC motor for higher harmonic voltage input is purely inductive, $\phi_{6+} = \phi_{6-} = 90°$ and $\phi_{12+} = \phi_{12-} = 90°$. Consequently, the positive and negative sequence harmonics can combine into one term and be decoupled as a single frequency component:

$$i_{sq} = i_{sq0} + i_{sq6}\cos(6\omega t) + i_{sq12}\cos(12\omega t) + \quad (4)$$

Referring to FIG. 7, $i_{sq}$ is given by equation (4). When multiplied by $\cos(6\omega t)$, at multiplier block 112, the result obtained is:

$$\begin{aligned} i_{sq}\cos(6\omega t) &= i_{sq0}\cos(6\omega t) + i_{sq6}\cos^2(6\omega t) + \\ &\quad i_{sq12}\cos(6\omega t)\cos(12\omega t) + \ldots \\ &= i_{sq0}\cos(6\omega t) + \frac{1}{2}i_{sq6}(1 + \cos(12\omega t)) + \\ &\quad i_{sq12}\cos(6\omega t)\cos(12\omega t) + \ldots \end{aligned} \quad (5)$$

After averaging the signal represented by equation (5) utilizing low pass filter block (LPF) 114, the output of LPF block 114 produces a signal represented by $i_{sq6}/2$, which after multiplication at multiplier block 116 by $2\cos(6\omega t)$ is subtracted at subtraction block 118 from $i_{sq}$. As a result, the 6th harmonic component is cancelled out and can no longer perturb the motor control current regulation system. The 12th harmonic can be cancelled out in a similar manner, as shown by circuit branch 120, 122, 124, 118 of FIG. 7.

Figure 8:
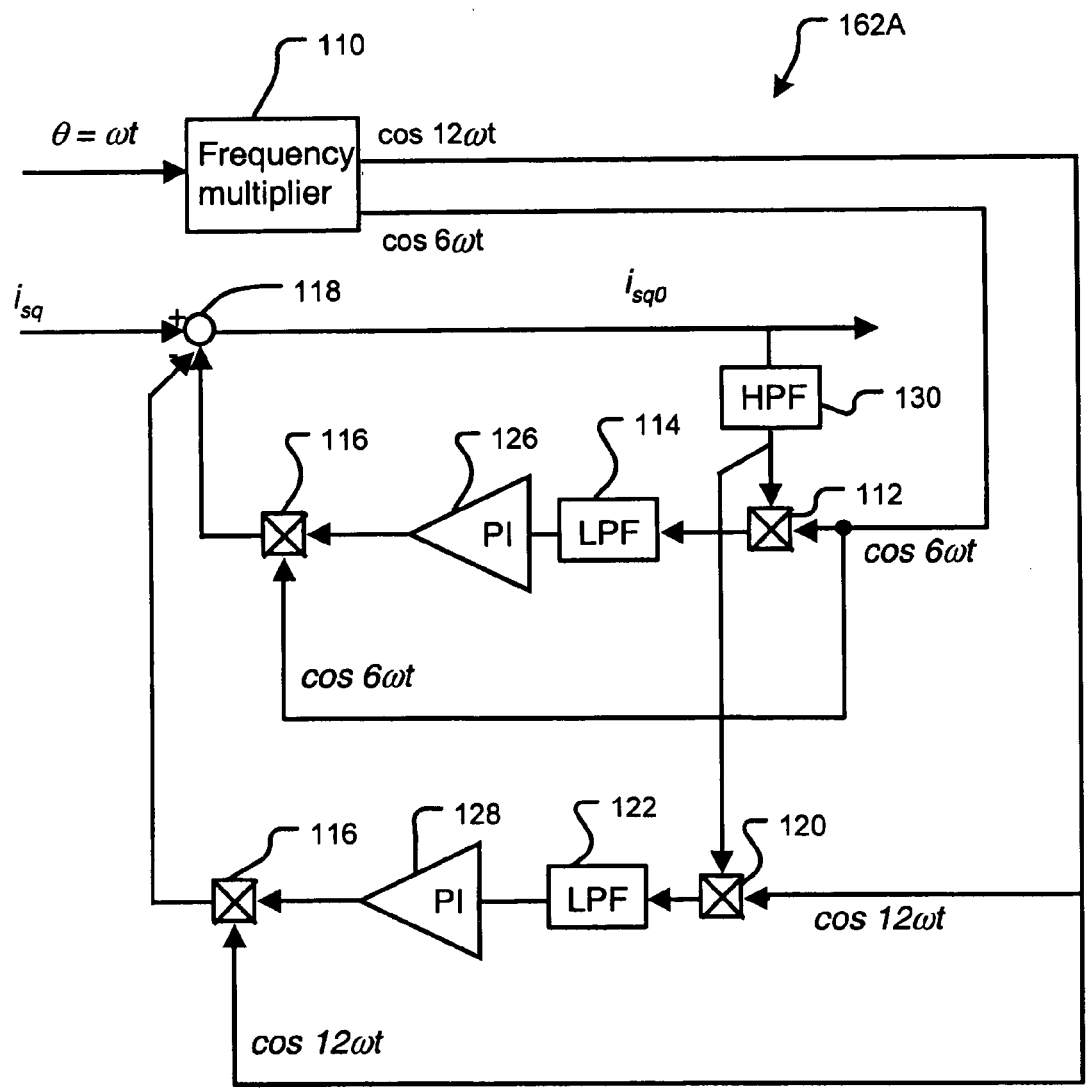
FIG. 8 is a block diagram representative of various other configurations of a decoupling circuit also suitable for use in the drive system of FIG. 7.

In yet another configuration and referring to FIG. 8, negative feedback is applied in a slightly modified channel block 162A to achieve essentially the same functionality as the circuit of FIG. 7. Improved amplitude control is achieved when block 162A is used as compared to block 162 of FIG. 7. Channel block 162A may be used as a q-channel block as illustrated, or as a d-channel block. Frequency multiplier block 110 may be the same as that described in conjunction with q-channel block 162 of FIG. 7, and block 110 and its output signals may be shared between the q-channel block and the d-channel block. Note that the input signal to multipliers 112 and 114 in block 162 of FIG. 7 is a signal representative of the motor phase current signal, more particularly, $i_{sq}$. In block 162A of FIG. 8, the corresponding input signal is a harmonic containing signal produced at the output of high pass filter block 130. To produce the harmonic containing signal, the corrected feedback signal $i_{sq0}$ is provided as input to high pass filter block 130. (For d-channel blocks, the corresponding signals would be $i_{sd}$ and $i_{sd0}$, respectively.)

In some configurations, the gain of the harmonic cancellation circuit branches may be set, for example, by PI blocks 126 and 128 in the channel block of FIG. 8. With appropriate selection, there may be no need for ×2 versions of the one or more 6n harmonic sinusoids.

Figure 9:
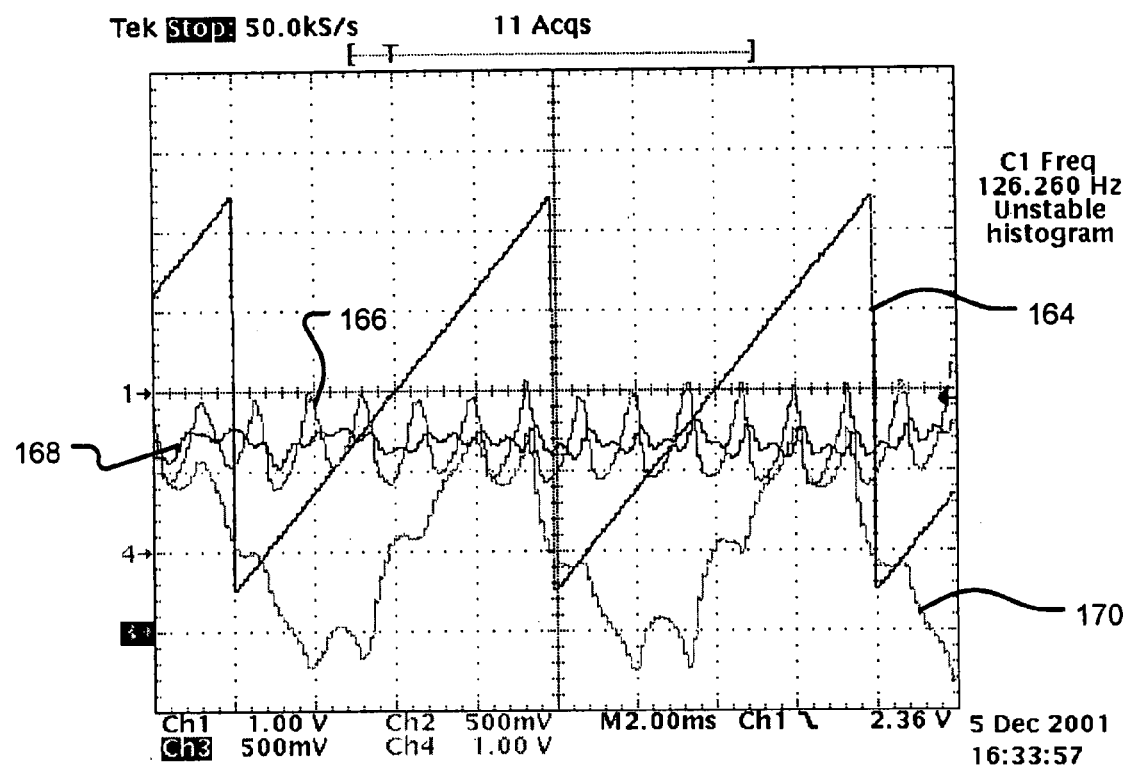
FIG. 9 is drawing showing an improved phase current waveform obtained by reducing only the 6th harmonic utilizing a configuration of the present invention.

Experimental results for channel block 162A, including the phase current waveform obtained by decoupling only the 6th order harmonic, are shown in FIG. 9. In FIG. 9, waveform 164 represents the stator voltage vector position. Waveform 166 represents $i_{sq}$ without harmonic decoupling. Waveform 168 represents $i_{sq0}$, i.e., $i_{sq}$ with 6th harmonic decoupling. (Twelfth harmonic decoupling was not included in this example.) Waveform 170 represents the improved phase current waveform with 6th harmonic decoupling.

In various configurations of the present invention, filter blocks such as 114, 122, and 130 are configured to have low group delay to increase stability of feedback loops.

Configurations of drive system 100 may be implemented using digital signal processing (DSP) hardware, discrete circuitry, or as combinations of both. In DSP implementations, blocks represented in the accompanying figures and/or described in the text may be implemented as stored program instructions that perform the operations shown and/or described herein. Efficiencies may be realized by design choices such as utilizing common, shared subroutine code between various blocks. However, if a configuration under consideration uses such sharing to simulate the operation of blocks described herein, these blocks should be considered literally present in the configuration under consideration.

A suitable digital signal processor for some configurations of the present invention is a Texas Instruments TMS320C25.

It will thus be appreciated that various configurations of the present invention reduce or eliminate higher order harmonics from feedback current signals in PWM inverters operating in the overmodulation mode. Various configurations of the present invention thus allow the use of high bandwidth current controllers within motor drive systems and avoid compromises in dynamic performance when operating in the overmodulation mode.

When using ordinal numbers (e.g., first, second, etc.) to refer to harmonics, these numbers are intended to indicate the order of the harmonic, e.g., the sixth harmonic. Otherwise, unless explicitly stated, ordinal numbers are used to distinguish different blocks that otherwise have similar names. This numbering does not necessarily indicate a temporal ordering, an ordering of importance, etc. Moreover, the terminology "first" and "second" is not intended to exclude from its scope configurations in which some components are shared for efficiency. For example, in a digital signal processor (DSP) implementation, the same physical components may be used for a "first multiplier block" as for a "second multiplier block," and/or code may be shared between them. In such cases, consideration should be given to whether the recited functions are being simulated to determine whether the recited blocks are literally present.

It is further noted that a "subtractor" block is intended to literally encompass an "adder" block having an inverted input signal applied, i.e., an input signal reversed in sign.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive system suitable for high bandwidth current control of a three-phase voltage source inverter in its overmodulation region, said system comprising:
   a feedback path including a harmonic decoupling block that extracts each of a plurality of selected harmonic components from signals representative of a corresponding motor phase current signal and subtracts each extracted component from the representative signals to generate corrected feedback signals;
   subtractor blocks that subtract the corrected feedback signals from signals representative of open-loop magnetizing reference currents to generate difference signals; and
   a modulation block that utilize said difference signals to produce signals to drive the three-phase voltage source inverter in an overmodulated six-step mode.

2. A drive system in accordance with claim 1 wherein said signals representative of a corresponding motor phase current signal are signals in a rotor field reference frame, and said feedback path further comprises:
   a coordinate transform block that transforms feedback signals in a stationary reference frame to said rotor-field-reference-frame signals; and
   the harmonic decoupling block that subtracts components of at least one 6n order harmonic contained in said rotor-field-reference-frame signals, to generate the corrected feedback signals;
   wherein n is an integer, n≧0, and said harmonics are relative to a fundamental frequency of the phase current of the three-phase voltage source inverter.

3. A drive system in accordance with claim 2, wherein said harmonic decoupling block subtracts components of at least a sixth order harmonic.

4. A drive system in accordance with claim 3 wherein said harmonic decoupling block comprises a d-channel block and a q-channel block, and said d-channel block and said q-channel block each comprise:
   a first multiplier block that multiplies a first signal input to the harmonic decoupling block by a first sinusoid at a sixth harmonic frequency to generate a base band signal indicative of a sixth harmonic component contained in the first input signal,
   a first low-pass filter block that inputs said base band signal and outputs a signal indicative of an average of the sixth, harmonic component contained in the first input signal, and
   a second multiplier block that multiplies said signal indicative of said sixth harmonic component contained in the first input signal by a second sinusoid at said sixth harmonic frequency to produce a sixth harmonic cancellation component signal;
   and said harmonic decoupling block further comprises a subtractor block that subtracts at least the sixth harmonic cancellation signal from one of said rotor-field-reference-frame signals to produce one of said corrected feedback signals.

5. A drive system in accordance with claim 4 wherein, in each of said d-channel block and said q-channel block, said first input signal is one of said rotor-field-reference-frame signals.

6. A drive system in accordance with claim 4 wherein said d-channel block and said q-channel block each further comprise a high pass filter block that lifters one of said corrected feedback signals to produce a harmonic containing signal, and wherein said first input signal is said harmonic containing signal.

7. A drive system in accordance with claim 4 wherein said harmonic decoupling block further comprises a frequency multiplier block that produces said sinusoids at said sixth harmonic frequency utilizing a second signal input to said harmonic decoupling block, wherein said second input signal is representative of a voltage vector signal from a three-phase motor.

8. A drive system in accordance with claim 7 wherein said first sinusoid utilized by said first multiplier block and said second sinusoid utilized by said second multiplier block are both phase-referenced to said second input signal.

9. A drive system in accordance with claim 3, wherein said harmonic decoupling block also subtracts components of a twelfth order harmonic.

10. A method for high bandwidth current control of a three-phase voltage source inverter, said method comprising:
    extracting each of a plurality of selected harmonic components from signals representative of a motor phase current signal in a feedback path and subtracting each extracted component from the representative signals to thereby generate corrected feedback signals;
    subtracting corrected feedback signals from signals representative of open-loop magnetizing reference currents to generate difference signals; and
    utilizing said difference signals to produce signals to drive the three phase voltage source inverter in an overmodulated six-step mode.

11. A method in accordance with claim 10 wherein said signals representative of a motor phase current signal are signals in a rotor field reference frame, and said method further comprises:
    transforming feedback signals in a stationary reference frame to said rotor-field-reference-frame signals; and
    subtracting components of at least one 6n order harmonic contained in said rotor-field-reference-frame signals, to thereby generate the corrected feedback signals;
    wherein n is an integer, n≧0, and said harmonics are relative to a fundamental frequency of a phase current of the three-phase voltage source inverter.

12. A method in accordance with claim 11, wherein said subtracting components of at least one 6n order harmonic comprises subtracting components of at least a sixth order harmonic.

13. A method in accordance with claim 12 further comprising, for each of a d-channel and a q-channel:
    multiplying a first signal input to a harmonic decoupling block by a first sinusoid at a sixth harmonic frequency to generate a base band signal indicative of a sixth harmonic component contained in the first input signal,
    low-pass filtering said base band signal to output a signal indicative of an average of the sixth harmonic component contained in the first input signal, and
    multiplying said signal indicative of said sixth harmonic component contained in the first input signal by a second sinusoid at said sixth harmonic frequency to produce a sixth harmonic cancellation component signal;
    and said method further comprises subtracting at least the sixth harmonic cancellation signal from one of said rotor-field-reference-frame signals to produce one of said corrected feedback signals.

14. A method in accordance with claim 13 wherein, in each of said d-channel and said q-channel, said first input signal is one of said rotor-field-reference-frame signals.

15. A method in accordance with claim 13 wherein said first input signal is said harmonic containing signal, and further wherein, for each of said d-channel and said q-channel, said method further comprises high pass filtering one of said corrected feedback signals to produce a harmonic containing signal.

16. A method in accordance with claim 13 further comprising producing said sinusoids at said sixth harmonic frequency utilizing a second signal input to the harmonic decoupling block, wherein said second input signal is representative of a voltage vector signal from a three-phase motor.

17. A method in accordance with claim 16 wherein said first and second sinusoids are both phase-referenced to said second input signal.

18. A method in accordance with claim 12 further comprising said harmonic decoupling block also subtracting components of a twelfth order harmonic.

19. A drive system suitable for high bandwidth current control of a three-phase voltage source inverter in its overmodulation region, said system comprising:
    a feedback path including a harmonic decoupling block that, to generate corrected feedback signals:
    subtracts selected harmonic components from signals in a rotor field reference frame, said rotor-field-reference-frame signals representative of a corresponding motor phase current signal, and
    subtracts components of at least one 6n order harmonic contained in said rotor-field-reference-frame signals, wherein n is an integer, n≧0, and said harmonics are relative to a fundamental frequency of the phase current of the three-phase voltage source inverter;
    said feedback path further comprising:
    a coordinate transform block that transforms feedback signals in a stationary reference frame to said motor-field-reference-frame signals;
    subtractor blocks That subtract the corrected feedback signals from signals representative of open-loop magnetizing reference currents to generate difference signals; and
    a modulation block that utilizes said difference signals to produce signals to drive the three-phase voltage source inverter in an overmodulated six-step mode;
    wherein said harmonic decoupling block subtracts components of at least a sixth order harmonic and comprises a d-channel block and a q-channel block each comprising:
    a first multiplier block that multiplies a first signal input to the harmonic decoupling block by a first sinusoid at a sixth harmonic frequency to generate a base band signal indicative of a sixth harmonic component contained in the first input signal,
    a first low-pass filter block that inputs said base band signal and outputs a signal indicative of an average of the sixth harmonic component contained in the first input signal, and
    a second multiplier block that multiplies said signal indicative of said sixth harmonic component contained in the first input signal by a second sinusoid at said sixth harmonic frequency to produce a sixth harmonic cancellation component signal;
    and said harmonic decoupling block further comprises a subtractor block that subtracts at least the sixth harmonic cancellation signal from one of said rotor-field-reference-frame signals to produce one of said corrected feedback signals.

20. A method for high bandwidth current control of a three-phase voltage source inverter, said method comprising:

subtracting selected harmonic components from signals representative of a motor phase current signal in a feedback path to thereby generate corrected feedback signals, said representative signals in a rotor field reference frame;

subtracting corrected feedback signals from signals representative of open-loop magnetizing reference currents to generate difference signals;

utilizing said difference signals to produce signals to drive the three phase voltage source inverter in an overmodulated six-step mode;

transforming feedback signals in a stationary reference frame to said rotor-field-reference-frame signals; and subtracting components of at least a sixth order harmonic contained in said rotor-field-reference-frame signals to thereby generate the corrected feedback signals, wherein said harmonics are relative to a fundamental frequency of a phase current of the three-phase voltage source inverter;

said method further comprising, for each of a d-channel and a q-channel:

multiplying a first signal input to a harmonic decoupling block by a first sinusoid at a sixth harmonic frequency to generate a base band signal indicative of a sixth harmonic component contained in the first input signal, low-pass filtering said base band signal to output a signal indicative of an average of the sixth harmonic component contained in the first input signal, multiplying said signal indicative of said sixth harmonic component contained in the first input signal by a second sinusoid at said sixth harmonic frequency to produce a sixth harmonic cancellation component signal; and subtracting at least the sixth harmonic cancellation signal from one of said rotor-field-reference-frame signals to produce one of said corrected feedback signals.

* * * * *